(12) United States Patent
Kiesel et al.

(10) Patent No.: US 7,463,945 B2
(45) Date of Patent: *Dec. 9, 2008

(54) ELECTRONIC FINGERPRINTS FOR MACHINE CONTROL AND PRODUCTION MACHINES

(75) Inventors: Martin Kiesel, Poxdorf (DE); Wolfgang Mutscheller, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/646,402

(22) Filed: Aug. 22, 2003

(65) Prior Publication Data

US 2004/0143360 A1 Jul. 22, 2004

Related U.S. Application Data

(63) Continuation of application No. 10/226,979, filed on Aug. 23, 2002, now abandoned, which is a continuation-in-part of application No. 10/052,293, filed on Jan. 18, 2002, now Pat. No. 6,954,680, which is a continuation-in-part of application No. 09/950,848, filed on Sep. 12, 2001, now Pat. No. 7,395,122, said application No. 10/226,979 is a continuation-in-part of application No. 09/950,726, filed on Sep. 12, 2001, now Pat. No. 7,292,900, said application No. 10/226,979 is a continuation-in-part of application No. 09/950,723, filed on Sep. 12, 2001, now Pat. No. 6,975,913, said application No. 10/226,979 is a continuation-in-part of application No. 09/950,731, filed on Sep. 12, 2001.

(60) Provisional application No. 60/305,199, filed on Jul. 13, 2001.

(51) Int. Cl.
*G06F 19/00* (2006.01)

(52) U.S. Cl. ..................................... 700/174; 702/182
(58) Field of Classification Search ......... 700/174–177; 702/182–185
See application file for complete search history.

(56) References Cited

U.S. PATENT DOCUMENTS

| 3,882,305 A | 5/1975 | Johnstone |
| 4,531,182 A | 7/1985 | Hyatt |
| 4,901,218 A | 2/1990 | Cornwell |

(Continued)

FOREIGN PATENT DOCUMENTS

DE 196 15 190 A1 10/1997

(Continued)

OTHER PUBLICATIONS

Edgar Dittmar, "Using Computers For Control," Elektrotechnik, Vogel Verlag K.G., Würzburg, Germany, vol. 77, No. 1/2, Feb. 21, 1995, pp. 16, 18, 21-22.

(Continued)

*Primary Examiner*—Zoila E Cabrera
(74) *Attorney, Agent, or Firm*—Scott T. Weingaertner; King & Spalding LLP

(57) ABSTRACT

An electronic fingerprint measures a state of a machine and/or process. A controller controls movements of at least one component of the machine and a fingerprint device selects, for measurement, certain movements of the machine for generating an electronic fingerprint that that is representative of a condition of the machine tool or process.

25 Claims, 8 Drawing Sheets

U.S. PATENT DOCUMENTS

| | | | |
|---|---|---|---|
| 5,224,051 A | | 6/1993 | Johnson |
| 5,291,416 A | | 3/1994 | Hutchins |
| 5,452,201 A | | 9/1995 | Pieronek et al. |
| 5,469,352 A | | 11/1995 | Yukutomo et al. |
| 5,586,041 A | | 12/1996 | Mangulkar |
| 5,602,757 A | * | 2/1997 | Haseley et al. ............ 702/56 |
| 5,726,912 A | | 3/1998 | Krall |
| 5,742,824 A | | 4/1998 | Kosaka |
| 5,805,442 A | | 9/1998 | Crater et al. |
| 5,844,795 A | | 12/1998 | Johnston et al. |
| 5,844,808 A | | 12/1998 | Konsmo et al. |
| 5,860,068 A | | 1/1999 | Cook |
| 5,966,897 A | | 10/1999 | Kirka et al. |
| 5,975,737 A | | 11/1999 | Crater et al. |
| 5,978,578 A | | 11/1999 | Azanya et al. |
| 6,026,348 A | | 2/2000 | Hala |
| 6,053,047 A | * | 4/2000 | Dister et al. ............ 73/593 |
| 6,061,603 A | | 5/2000 | Papadopolous et al. |
| 6,094,600 A | | 7/2000 | Sharpe, Jr. et al. |
| 6,260,004 B1 | * | 7/2001 | Hays et al. ............ 702/183 |
| 6,263,487 B1 | | 7/2001 | Stripf et al. |
| 6,289,735 B1 | * | 9/2001 | Dister et al. ............ 73/579 |
| 6,298,308 B1 | | 10/2001 | Reid et al. |
| 6,330,525 B1 | * | 12/2001 | Hays et al. ............ 702/183 |
| 6,338,003 B1 | | 1/2002 | Kamguchi et al. |
| 6,385,497 B1 | | 5/2002 | Ogushi et al. |
| 6,393,380 B1 | | 5/2002 | Zemlo |
| 6,445,969 B1 | | 9/2002 | Kenney et al. |
| 6,463,352 B1 | | 10/2002 | Tadokoro et al. |
| 6,473,656 B1 | | 10/2002 | Langels et al. |
| 6,507,765 B1 | | 1/2003 | Hopkins et al. |
| 6,556,956 B1 | | 4/2003 | Hunt |
| 6,560,513 B2 | | 5/2003 | Krause et al. |
| 6,604,013 B1 | * | 8/2003 | Hamidieh et al. ......... 700/175 |
| 6,799,195 B1 | | 9/2004 | Thibault et al. |
| 2001/0049567 A1 | | 12/2001 | Takeuchi |
| 2002/0007422 A1 | | 1/2002 | Bennett |
| 2002/0013639 A1 | | 1/2002 | Fujishima et al. |
| 2002/0083145 A1 | | 6/2002 | Perinpanathan |
| 2003/0100299 A1 | * | 5/2003 | Ko et al. ............ 455/423 |

FOREIGN PATENT DOCUMENTS

| | | |
|---|---|---|
| DE | 199 30 660 | 1/2001 |
| EP | 0 051 861 A2 | 5/1982 |
| EP | 0 428 735 A1 | 5/1991 |
| EP | 0512 116 A1 | 11/1992 |
| EP | 0 822 473 A3 | 2/1998 |
| EP | 1 102 185 A2 | 5/2001 |
| EP | 0 875 023 | 7/2001 |
| EP | 1 115 080 | 7/2001 |
| WO | 99/22489 | 5/1999 |
| WO | WO 00/62138 | 10/2000 |
| WO | WO 00/73955 A2 | 12/2000 |
| WO | WO 01/50704 A2 | 7/2001 |
| WO | 02/05199 | 1/2002 |

OTHER PUBLICATIONS

Hans B. Kief: "NC/CNC Handbuch", 1995, Carl Hanser Verlag, München Wien, XP002227602, pp. 238-242; 296-297; and 318-319.

U. Rembold, P. Levi: Realzeitsysteme zur Prozessautomatisierung, 1994, Hanser Verlag, München, pp. 624-625; pp. 638-651; pp. 660-661.

Artikel Bosch "Typ3 osa- The universal NC, PLC, and PC control system", Nov. 12, 2001.

R. Fernandez: "An Object-Oriented Implementation of Low Level Digital Control Algorithms in the Microsoft Windows/C++ Environment", Proceedings of the International Symposium on Intelligent Control, Monterey, Aug. 27-29, 1995, New York, IEEE US. pp. 229-235.

Naoki Ura et al: "Remote Maintenance Function for Distributed Control System", Advances in Instrumentation and Control, Instrument Society of America, Research Triangle Park, US, vol. 48, Part 3, 1993, pp. 1557-1564, XP000428426.

DOD Standard Transmission Control Protocol, Information Sciences Institute, USA, Jan. 1980, pp. 1-83.

Michael Kmiec: "PhorSale 1.0.8B—An eCommerce application for PHP and mySQL, File: phorSale.sql", Online!, Jun. 14, 2001, Freshmeat:Net, XP002219121.

Judith S. Bowman, Sandra L. Emerson et al.: "The Practical SQL Handbook", Sep. 1998, Addison Wesley, Reading, Massachusetts, XP002219122, p. 63.

Erkes J.W. et al: "Implementing Shared Manufacturing Services on the World-Wide Web", Communications of the Association for Computing Machinery, New York, US, vol. 39, No. 2, Feb. 1, 1996, pp. 34-45.

International Search Report for PCT/EP02/07511.
International Search Report for PCT/EP02/07512.
International Search Report for PCT/EP02/07513.
International Search Report for PCT/EP02/07514.
Abstract of WO 01/02891 A2, published Jan. 11, 2001.
Abstract of WO 97/39393, published Oct. 23, 1997.
Abstract of WO 90/02366, published Mar. 8, 1990.
Hoske et al., "New CNC Controller is 'Fully Open'," Control Engineering International, vol. 43, No. 15, pp. 69-70, Nov. 1996.
European Appln. No. 03019016.9—Search Report dated Aug. 28, 2007, mailed to Applicant on Sep. 6, 2007.

* cited by examiner

ELECTRONIC FINGERPRINTS FOR MACHINE CONTROL AND PRODUCTION MACHINES

This application is a continuation of application Ser. No. 10/226,979, filed on Aug. 23, 2002 now abandoned, which is a continuation-in-part of application Ser. No. 09/950,848, filed on Sep. 12, 2001; application Ser. No. 09/950,726, filed on Sep. 12, 2001; application Ser. No. 09/950,723, filed on Sep. 12, 2001, which issued as U.S. Pat. No. 6,975,913 on Dec. 13. 2005; application Ser. No. 09/950,731, filed on Sep. 12, 2001; and application Ser. No. 10/052,293, filed on Jan. 18, 2002, which issued as U.S. Pat. No. 6,954,680 on Oct. 11, 2005, which claim priority under 35 U.S.C §119(e) to provisional Application No. 60/305,199, filed on Jul. 13, 2001.

FIELD OF THE INVENTION

The present invention relates in general to machine control and production machines and, in particular, to monitoring, measurement and maintenance in connection therewith.

BACKGROUND

Trace functionality is available in automation systems and drives, as are trace-selectable feedback or fixed parameters or process values. All parameters of a controlled process may be traceable when such functionality is available. For example, it is normal practice today to employ trace functionality to control currents or motor currents. Trace functionality is used to set up the controls associated with a production machine. Trace functionality, however, is not believed to have been used to develop or bring about new features in drive control, motion control or numeric control, nor is it believed to be used to describe the characteristics of a production machine or to generate such characteristics for use in the improvement of the quality of controlled processes or the products they generate.

SUMMARY OF THE INVENTION

The present invention overcomes at least some of the deficiencies of the art described above, and many others by providing machine fingerprints and systems for the generation and use.

One aspect the present invention is directed to an electronic fingerprint apparatus for a machine. The apparatus comprises an automation component having a controller for controlling movements of at least one component of the machine, the automation component adapted for capturing electronic fingerprints representative of a state of the machine. The apparatus further comprises a fingerprint device for selecting for measurement a plurality of movements of the machine to generate an electronic fingerprint that is representative of a condition of the machine.

Another aspect of the present invention provides a method for generating electronic fingerprints of a machine. The method comprises the steps of selecting for measurement parameters associated with at least one component of the machine that are representative of a condition of the machine, reading the parameters and storing the read parameters, thereby creating an electronic fingerprint representative of a condition of the machine.

BRIEF DESCRIPTION OF THE FIGURES

FIG. 2b shows an embodiment of an electronic fingerprint according to an aspect of the present invention, showing an abnormal condition of the machine for which the normal fingerprint was depicted in FIG. 2a.

DETAILED DESCRIPTION

As used in describing the various aspects of the present invention, "electronic fingerprints" of a machine tool or a production machine include a set of measurements that are characteristic, and document the behavior, of the machine. Machine control and production machines have variations in their behavior that make each machine unique. These unique behavioral traits may be truly machine-specific, differing even as between machines of the same type and character, or of the same model and that are otherwise seemingly identical. No matter how similar two machines may appear, an aspect of the present invention recognizes that they will always have some unique behavior that can be isolated and documented to identify a condition of the particular machine. The differences between machines generally grows more pronounced over time. The operation of the machine may, and indeed often does, alter its working components or their alignment or position, thereby changing the behavioral characteristics of the machine. The set of behavioral characteristics that uniquely identify a particular machine are within the definition of the term "electronic fingerprints," as used here.

A method according to one aspect of the present invention determines, for any particular machine, the set of characteristics that uniquely identify the condition or state of that machine. Another aspect of the present invention involves identifying which measurements will capture unique characteristics of a production machine. That is, the identified measurements characterize the individual characteristic of the machine. Also according to an aspect of the present invention, it is optimum to identify a minimal set of behavioral characteristics that identifies the particular machine. In addition, the electronic fingerprints according to the present invention are derived such that, no matter how the fingerprint evolves over time, a fixed fingerprint system is developed so that the machine condition can be identified over time.

Use of electronic fingerprints according to the present invention confers many advantages. For one thing, their use allows the operator to check the instantaneous condition of the machine. Further, changes in the behavior of a machine can be determined by comparison of certain measurements representing an initial state to those representing a later state of the machine. The resultant deviation can yield evidence as to the machine's condition and its present and future performance. The measurements may be repeated periodically to further analyze machine behavior. Electronic fingerprints can thus be used according to another aspect of the present invention for predictive maintenance by using the fingerprint to indicate an existent or eventual condition of the machine, before the condition is otherwise detectable.

Figure 1:
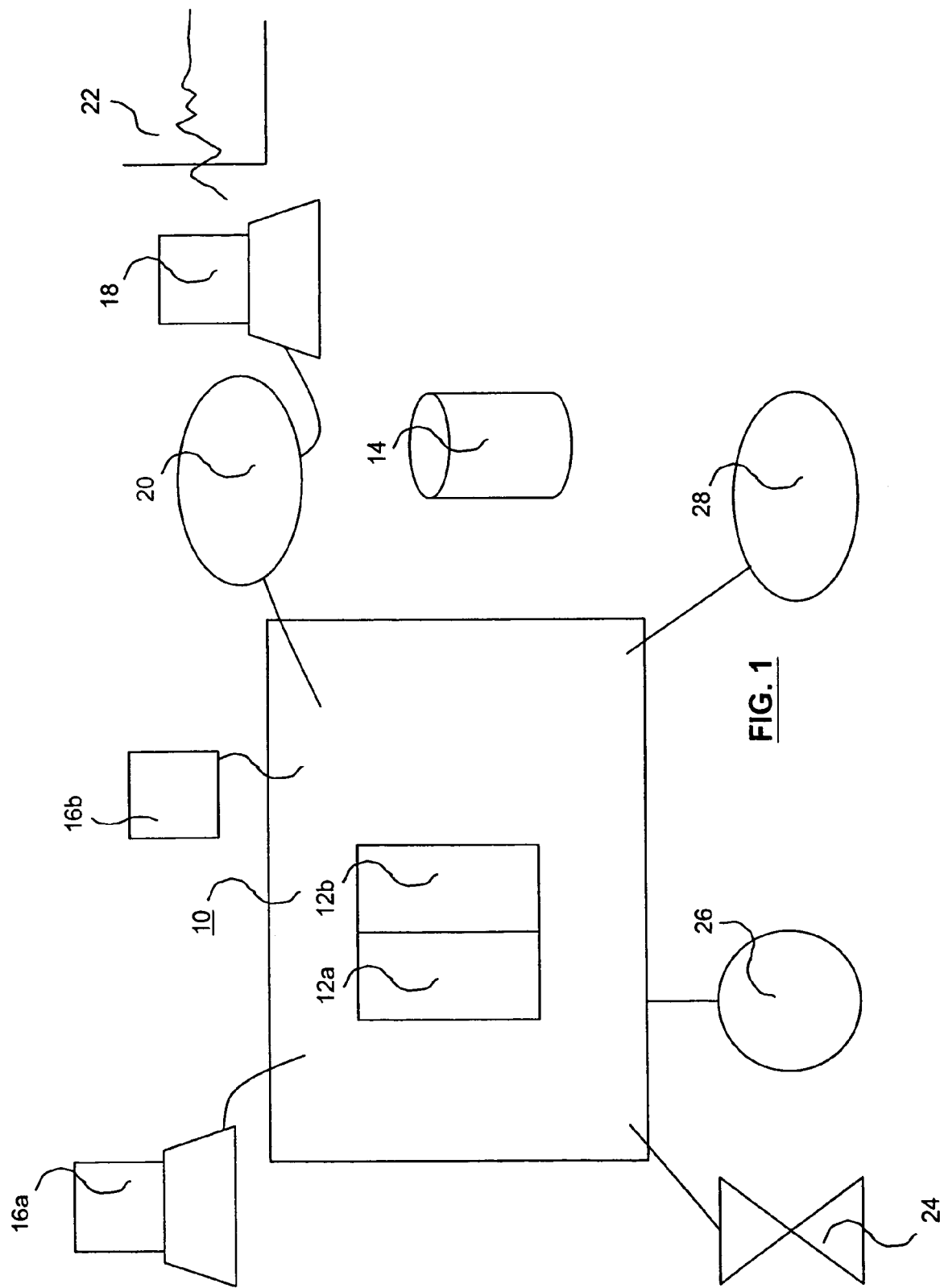
FIG. 1 shows in schematic form, along with associated control-related equipment, an automation component for determining electronic fingerprints of a machine tool or production machine, in an embodiment of an aspect of the present invention.

FIG. 1 shows an automation component 10 that makes mechanisms available for determining electronic fingerprints according to an aspect of the present invention. The automation component 10 may, for example, be part of a machine tool or other production machine. A controller 12a (e.g., a PLC) provides for logic control, and the mechanical component that is driven by the controller (e.g., motion control or numeric control) 12b provides for the control of the motion of mechanical parts of the production machine and associated workpieces. As an alternative, one controller could perform both the logic and motion control tasks. A user interface 16a provides the user with a screen or other interface for the monitoring and control of the automation component 10.

A separate user interface 16b provides a user interface having an engineering system and provides for the setup, configuration, and programming of the automation component. The user interfaces 16a and 16b, in one embodiment, might run on one hardware platform. In addition, remote access to a remote PC 18, for example, through a communication channel 20, such as the Internet or Intranet, may be provided by an appropriate interface and TCP/IP, Ethernet, or other network. An analysis 22 of the machine can be derived and displayed at the remote PC, for example. A machine data server 14 is linked to the automation component. The present invention specifically provides means for identifying the state of the machine and/or product, and an associated condition, by means of a fingerprint of the machine at a given time. The automation components provide means for capturing fingerprints of the machine.

Additional input/output signals are provided, depending on the type of machine being controlled. Here, for example, an input/output rack is provided for inputting and outputting signals 24, such as those associated with a programmable logical controller (PLC). Also provided is an axis mechanism 26, which controls an axis of a movable piece of the machinery, such as robotic arm, drill press, etc. The machine may also be coupled to other processors, such as via a communication network 28.

In order to obtain and analyze the fingerprints, the present invention provides a graphical user interface (GUI) 18. This may, for example, be a human machine interface (HMI) that is modified, according to the present invention, to "lift," store and examine the fingerprints. The interface could be provided, for example, on a host PC and connected to the automation component by a communication interface, such as the Ethernet or Internet. With the interface provided, the fingerprints can be evaluated manually or automatically according to a particular description as set forth below.

As already indicated, an aspect of the present invention involves knowing which measurements to make in order to reveal the electronic fingerprint. The technique may vary according to the type of machine involved. For example, machine tools having a cutting function can be caused to undergo a test trace function. However, other machines, such as a pump, may have no trace capability. The present invention includes various techniques, dependent on the type of machine, to develop, or "lift", the electronic fingerprint. The recognition of the fingerprints is realizable using various techniques.

Fingerprint functionality according to the present invention can be implemented in the system software of the automation component 10. As already mentioned, electronic fingerprints can be realized concretely using, for example, an application of a trace test for machine tools having a trace functionality with a numerical control. In another aspect of the present invention, the automation component includes an easily programmable expiration operational sequence. Using such application programs, the fingerprints can be developed or "lifted." The automation component makes suitable Application Program Interfaces (API) accessible to an application program for taking up of fingerprints.

If the condition or state of the machine is regarded is its fingerprint, lifted using programming applications, for example, the programming signals might be thought of as the "dust" with which the fingerprints are formed. These signals may, for example, be internally accessible signals that are suitable for documenting the quality of an expiration or a process. The process-specific parameters are defined accordingly. Also, any of the measured values of drives, parameters from motion controllers, production machines or format data from the application program may be utilized.

In one example, the signal may be measured from distinct, event-controlled signals that are generated cyclically or during a certain period. For another, the measured signals are derived from the control and/or by control/application via auxiliary sensor technology. If necessary, the auxiliary sensor technology could include, for example, accelerometers.

Figure 2B:
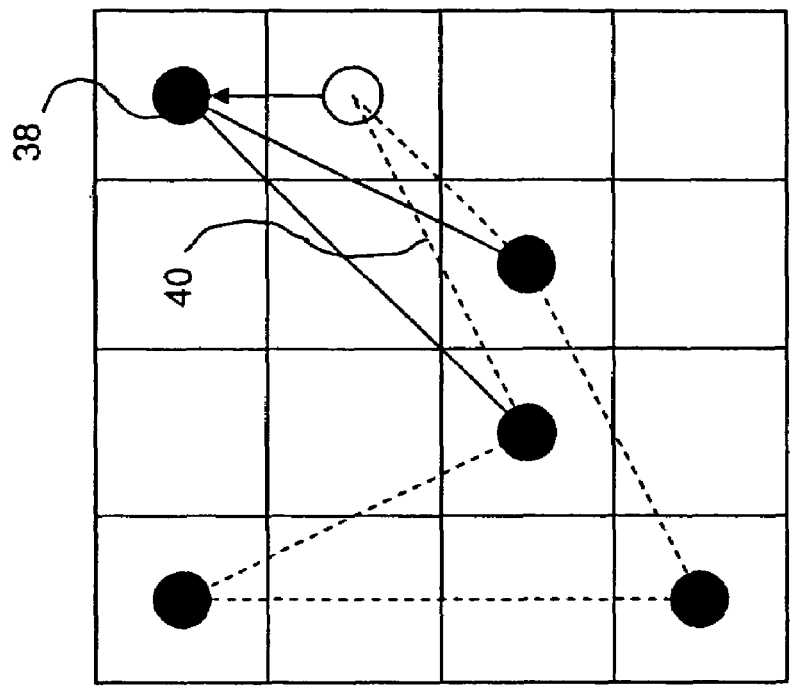
Figure 2A:
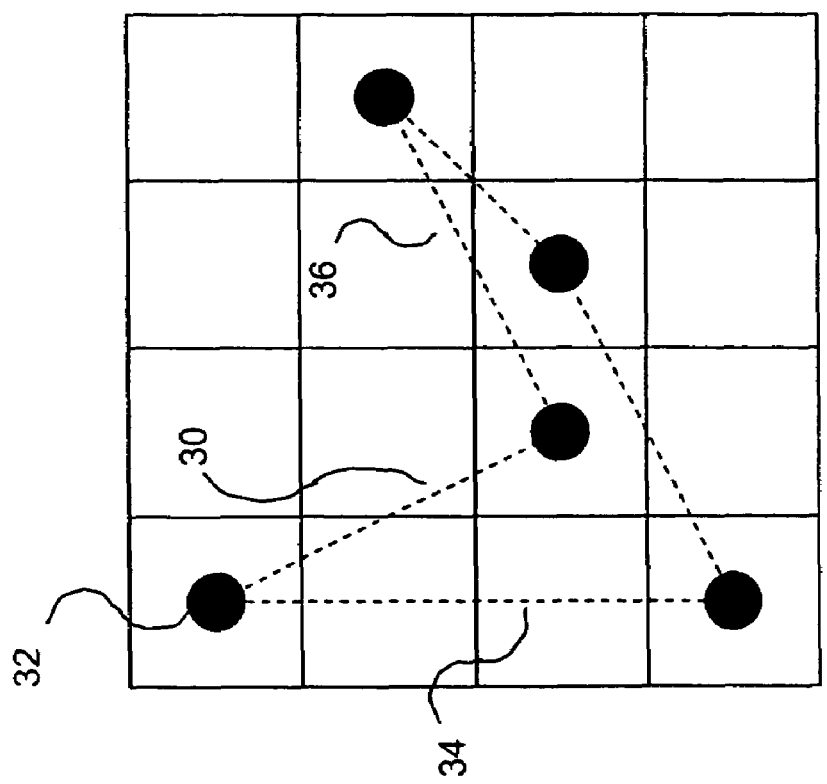
FIG. 2a shows an embodiment of an electronic fingerprint according to an aspect of the present invention, showing a normal condition of a machine.

As shown in FIG. 2a, the electronic fingerprint 30 of the present invention can be visualized as a two-dimensional graph. As shown, the parameter points 32, whose values are indicated by the position in the matrix 34, are connected by the dashed lines 36. In this manner, it can be readily seen that the electronic fingerprint of the present invention is similar to an actual fingerprint in the sense that it maps out an imprint that is characteristic of the machine from which the electronic fingerprint is lifted. The fingerprint shown in FIG. 2a is a simplified representation of what could otherwise be expressed as a complex array of parameter points and that can also be represented as an n-dimensional fingerprint displayed as a computer graphic.

As will be appreciated from FIG. 2, the condition of the machine can be determined from the fingerprint. FIG. 2b, for example, shows a fingerprint that reveals an abnormal condition. Illustrated by the deviation 38 (indicated by the arrow), the condition represents a departure or variance from the abnormal fingerprint of FIG. 2a. The variance 40 can be thought of as an area underneath the portion of the fingerprint lying outside the healthy fingerprint. Fingerprints can be stored in advance in a database and later compared. Also, abnormal fingerprints can be collected over time to form a database for future reference in other applications. The electronic fingerprints according to the present invention are clearly advantageous for analyzing machines in this manner because of the ease with which they identify any deviations. Particularly useful is their ability to permit visual inspection of the fingerprints by a user. At a glance, they can reveal whether the machine is in an error condition or not.

The fingerprint may be representative of a plurality of machine-related states, including, for example, a machine behavior. The fingerprint may also be representative of product quality, which may depend on both the machine and the material. In the example of FIGS. 2a and 2b, the fingerprint may indicate, in a laser cutting machine, a special relationship between the speed of movement of the laser and its power. If, for example, the relationship is not maintained in the correct fingerprint (FIG. 2b) the laser will move too slowly and burn holes in the work piece. On the other hand, the laser may move too quickly and fail to cut the material. When the process is stable, as in FIG. 2a, then the product quality can be assured, i.e., that the work piece is properly cut by the laser in this example.

As with any fingerprint, the electronic fingerprint is developed for analysis, a sort of electronic sleuthing. The evaluation (e.g., PC) software, as described above, runs an automated comparison/evaluation of the fingerprints. The results of the comparison/evaluation have wide application, including, without limitation, preventing recognition of machine wear, quality assurance, maintenance, production data collection, error evaluation, documentation of the error, identifying delivery status or condition after software boot up and automatically correcting errors. In error evaluation for diagnostics, in particular, the fingerprints can be derived when the machine is running improperly. This is preferably achieved when the machine is running certain critical procedures, from which conclusions may be drawn as to possible errors.

The generation of the fingerprints can be achieved using the following applications, for example. Parameters for the fingerprint may be obtained from the engineering system, or other suitable source. Control parameters may be sensed in the course of configuring monitoring points, for example, and which axis is to be controlled. Otherwise, the parameters may be obtained upon configuration of the observation parameters (e.g., situation layer, moment actual values, observer values, application variables, etc.). The fingerprint parameters may also be developed from the parameters resulting from a start and stop event for recording projections or over application program control.

In another manner according to the present invention, the fingerprints can be produced at the software vendor end. This can be achieved by marking appropriate attributes of the relevant data/variables during programming of the software. This is supported by the Engineering System (FIGS. 1, 16b) of the automation component. The measurements may be taken, for example, from the trace information. In addition, the vendor can provide for the measurements along with the evaluation software for evaluation using the evaluation PC. Evaluation software for comparison of the fingerprints may be provided, for example, according to an aspect of the present invention. The application software, software for fingerprint production (running in the automation component) and evaluation software (running in the evaluation PC) can be provided in any of the known, or equivalent, programming languages, including Java, for one example.

The fingerprint application can be applied according to various methods of the present invention. In one method, the fingerprint application is downloaded through the PC communication connection to the machine, i.e., automation component. Further, the application can be applied by deliberate machine service personnel, via an external service branch. The fingerprint application could be started automatically by the application program itself, during certain maintenance or time intervals, during reequipping procedures, or at other suitable times. Additionally, the fingerprint program may be implemented by remote operation, for example, over the Internet. Also, the fingerprint measurement application can be optionally supported by a deposited workflow. In accordance with another aspect of the present invention, the user manually performs measurement of the fingerprints of the selected machine and causes the PC to note target/actual conditions, such as occur cyclically over a certain length of time, for example.

Like all fingerprints, the electronic fingerprints may be profiled. The first step in profiling of the fingerprints is achieved by storing them in a suitable memory. In the machine/automation component, for example, the fingerprint can be stored on a hard disk, memory card or the like. Alternatively, the fingerprint can be stored on the data server of the machine (FIG. 1 at 14), or on the evaluation PC, by remote file. The fingerprints may even be stored in additional machine information storage, such as production data or format information data.

Once fingerprints are stored, their profiling continues by conducting an evaluation process. This process may take place in the evaluation PC and may be accomplished either manually or automatically. From the results of the analysis, adjustments to the machine may be derived. Composites of "healthy" fingerprints may be stored in advance in the evaluation software. These may, for example, be in the form of tolerances of the various machine components. A capability for such analysis permits the fingerprints to be evaluated or developed over time.

The structure of various aspects of the present invention has been described. Below are examples of actual applications employing the invention. The following examples illustrate operation of aspects of the present invention in regard to two types of machines, namely the production machine and the machine tool. In the former, the overall fingerprinting is concerned with the determination of product quality, or machine quality, or with both aspects. In contrast, the machine tool focuses on the determination of the machine quality, i.e., machine condition. As with many measuring procedures the quality of the processing material and the machine quality produce overlapping effects, and these examples are no exception. In any event, the following examples are described.

The first example concerns a packaging machine. It is desired, for example, to perform a pressure mark correction procedure, which corrects the pressure mark of the packaging machine. In this instance, measurements of the process are collated into an actual value profile. The same measurements can be derived from a fast pressure mark correction, when a fast correction is made. The actual value profile changes can be compared over time. With such a comparison, the end product can be influenced directly.

In the same packaging machine, a real time view of the motion of the machine may also be viewed. Critical ranges in the total course of motion with a trace, for example, can be obtained. This could be performed, for example, with seam welding, such as in foil welding. Relevant parameters may be measured for a view of the process, and measured parameters may be the target values from the control and/or the drive. The measured values may also be actual values of sensor technology or process variables from the application.

Also provided is a kind of test operation, applying a test drive procedure for testing the machine. In the test operation, a cyclic machine clock of a packaging machine with a defined production speed cycles through critical sections of the course of motion. During this time the relevant actual values that occur are recorded according to an aspect of the present invention.

The above example is directed primarily to the operation of the machine. In an injection molding machine example, greater emphasis may be placed on the quality of the product. Here, the injecting process for a certain tool is examined. As with any given tool, prescription data may normally be provided, such as the profile, temperature attitude, etc. The prescription data is taken as the base fingerprint that is compared to actual data received over certain periods. The data is obtained from the injecting process based, for example, the manner in which the pressure or strength of the injection is applied. The values may be compared, for example, in one embodiment, using an integral-based averaging algorithm, which is applied to values collected over a predetermined period of time. From the measured variables, load differences and aging influences of the tool, for example, can be derived. With this data, an improved influence over the quality of the end product may be obtained.

According to the foregoing description, a fingerprint for a machine tool or production machine may be derived to determine a condition of a machine or to monitor the quality of the production machine. With the foregoing fingerprint parameters it is also possible to troubleshoot existing problems. The following presents two simple examples in which such machine problems can be pinpointed by fingerprint measurements. The main technique applied measures the fingerprints periodically and compares the deviations of the results with the initial measurements.

Figure 3:
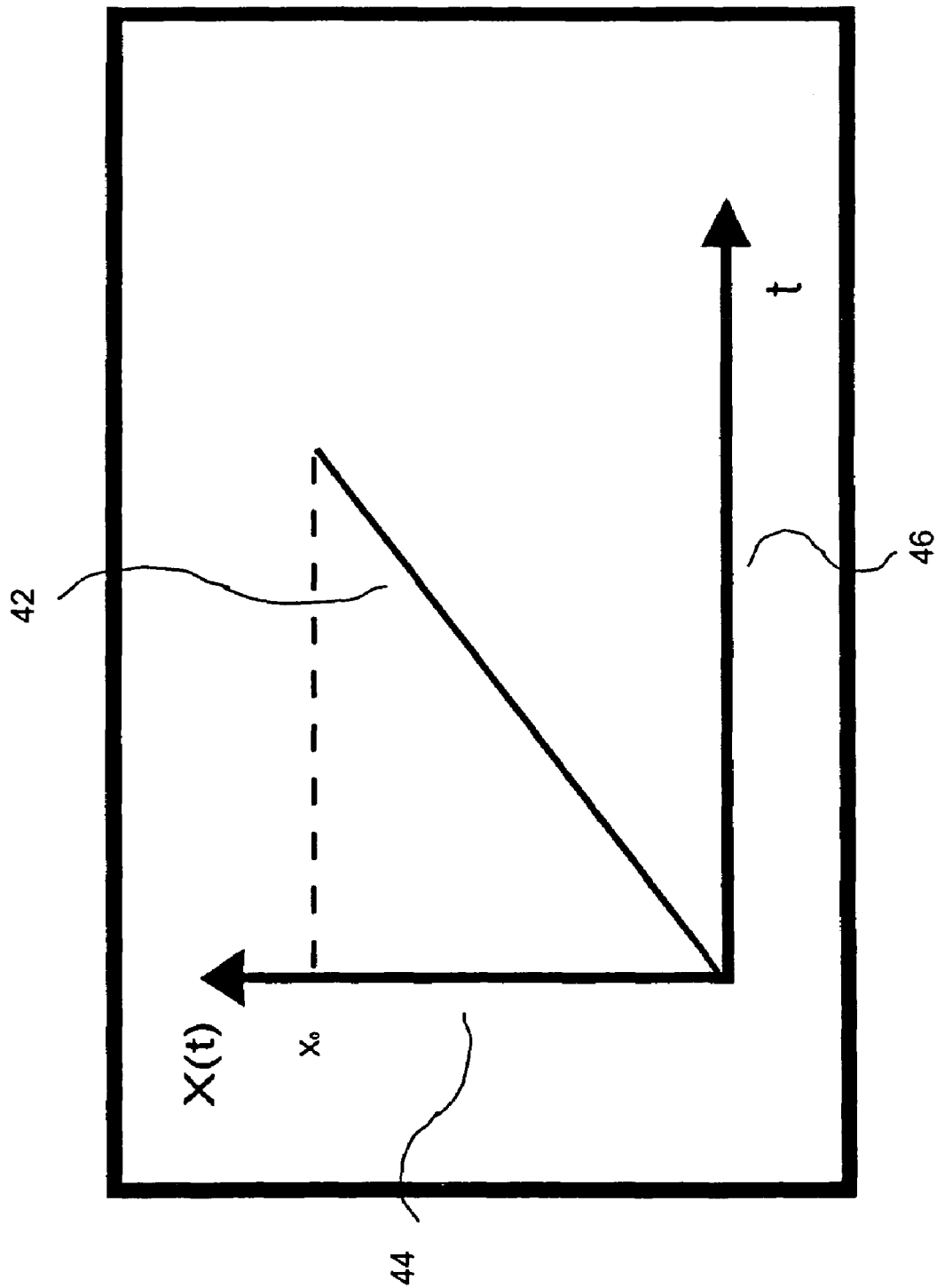
FIG. 3 shows a graph of measurements obtained from an operation for changing a periodic error in the pitch of a ball screw, illustrating an embodiment of an aspect of the present invention.

FIG. 3 illustrates a graph of measurements obtained from an operation for changing a periodic error in the pitch of a ball screw. It is assumed, according to the example, that the ball screw drives an axis, X. In addition to a motor measuring system, an additional linear scale is also provided along the axis X. The motor measurement system is used for closed loop control, while the linear scale is used as a measurement device during the present measurement. If the axis is moved with a constant speed along a certain travel area, $X_0$, the ideal behavior is shown in FIG. 3.

The movement $X(t)$ of the axis is ideal to demonstrate the value of the invention, as inaccuracies during the production process of the mechanical components of the machine are experienced in the actual world. For instance, it is very often the case that a real ball screw exhibits a cyclic error in the pitch in comparison to its ideal behavior. Due to mechanical forces, this error is magnified over a certain time period.

Figure 4:
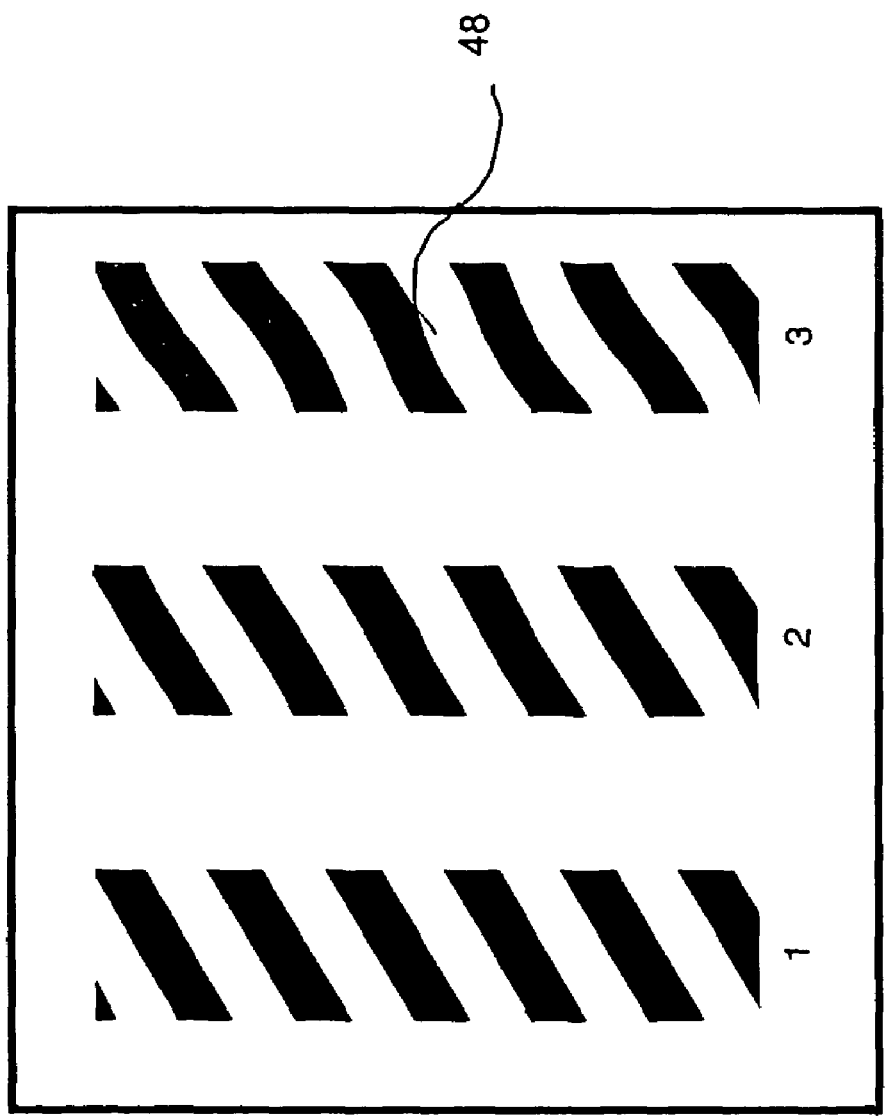
FIG. 4 shows, schematically, states associated with a deterioration of the ball screw of FIGS. 2a, 2b and 3.
Figure 5:
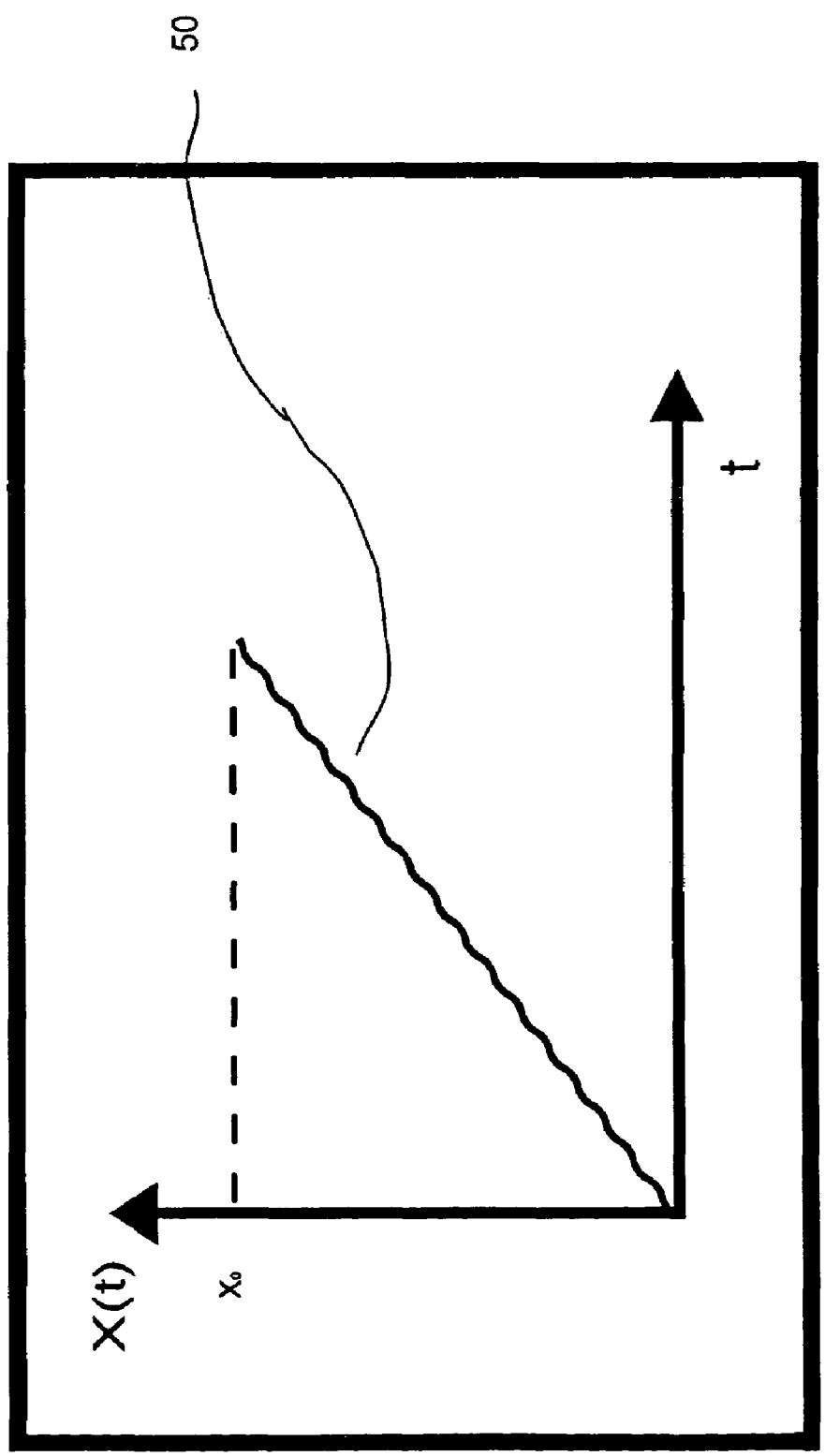
FIG. 5 shows a graph depicting the behavior of the worn ball screw represented in FIG. 3.

FIG. 4 shows, from left to right, a deterioration of the ball screw over time and, in particular, over consecutively numbered discrete states. This situation is further illustrated in FIG. 5, on a graph of the form shown in FIG. 3. In FIG. 5, in which the behavior of the worn ball screw is represented, the cyclic errors in the pitch are shown enlarged and in schematic form. It may be, for example, that the error of the ball screw is enlarged after a certain time of machining due to mechanical forces.

Now, if the error exceeds a certain period of time, the ball screw should be changed in order to avoid inaccuracies during machining. These errors can be measured in the following way according to the present invention. In the first instance, the axis is moved with a constant speed and only the motor measurement system is used for closed loop control. In this case, the motor moves with a constant rotation speed. The constant speed yields a constant rotation of the ball screw. The pitch error is translated to the linear scale, showing a periodic deviation from the ideal behavior, as is apparent from the figures.

Figure 6:
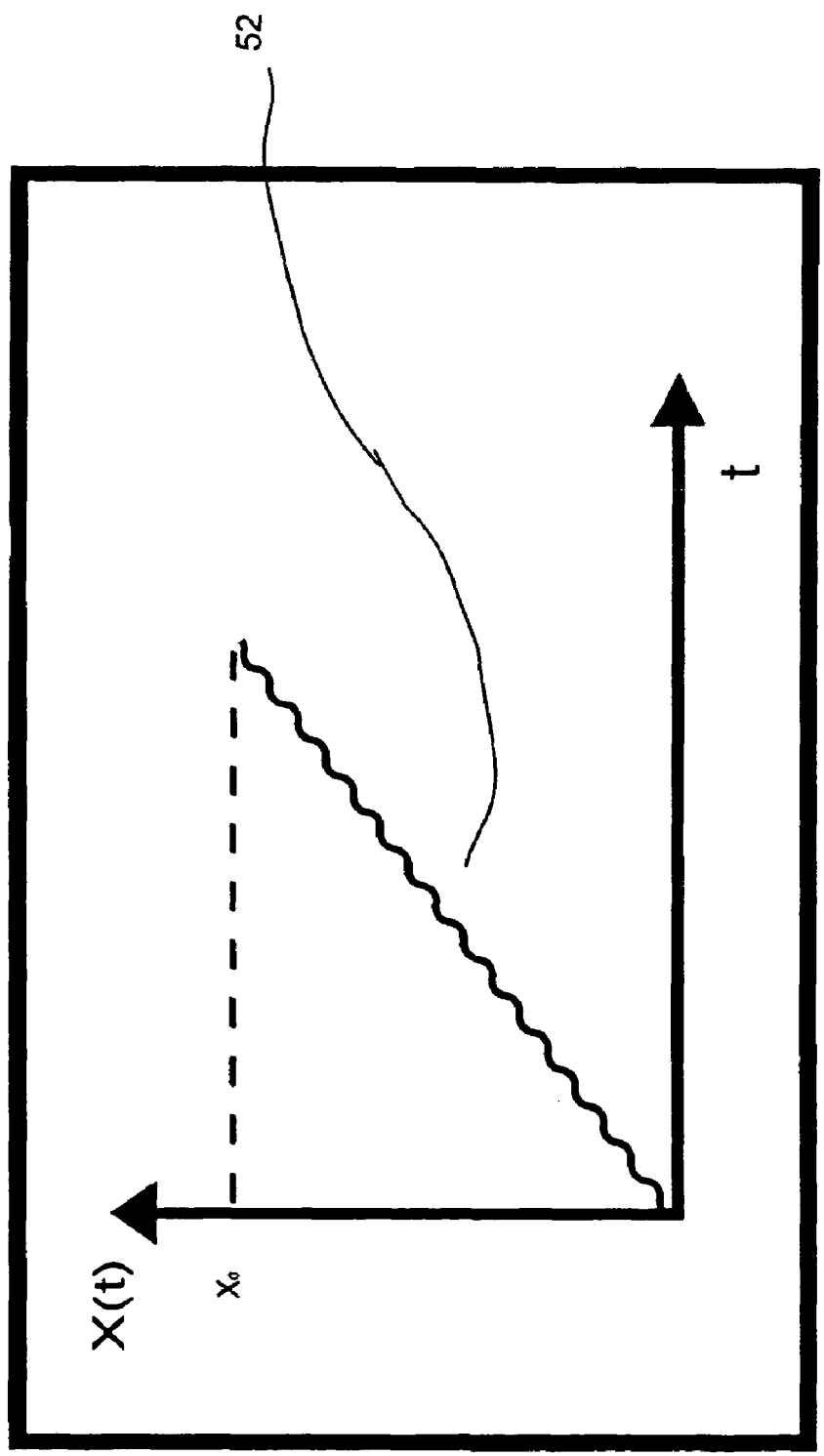
FIG. 6 shows cyclic deviations in a signal representing a direct measurement of cyclic pitch errors associated with the ball screw, in an embodiment of an aspect of the present invention.

In FIG. 6, cyclic deviations of the signal of the direct measurement system in case of cyclic pitch errors are shown, where the motor measurement system is used for closed loop control. In this case, the more the errors in the pitch are enlarged, the more there are likely to be deviations within the signal of the linear scale. At this time, if the axis is measured periodically in this way, it is possible to discern critical errors before work pieces are damaged. In other words, it is possible to change the ball screw at a point in time before the critical state is reached, rather than after a fixed period of time, or to change the compensation values for the screw pitch error automatically.

Figure 7:
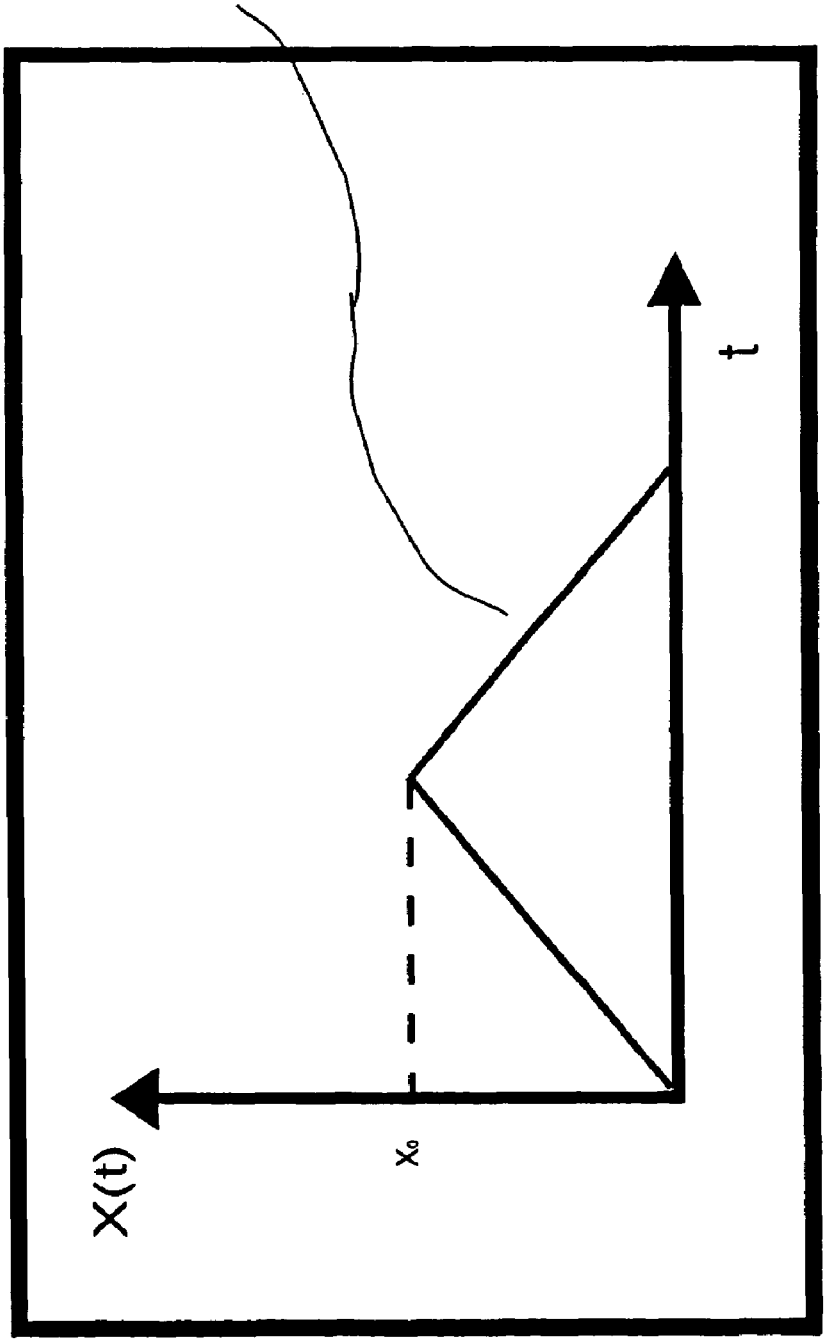
FIG. 7 shows another embodiment of an aspect of the present invention in the context of a measurement of backlash in a gear box.

As shown in FIG. 7, in another example, backlash detection is demonstrated. By means of the same method of the invention, it is also possible to detect, for example, a backlash in a gear box. Backlash may occur as a result of a build up of mechanical stresses. For this measurement, we move the axis forward and backward at a constant speed. Again, only the motor measurement system is used for closed loop control and the linear scale is used only for measurement purposes.

Figure 8:
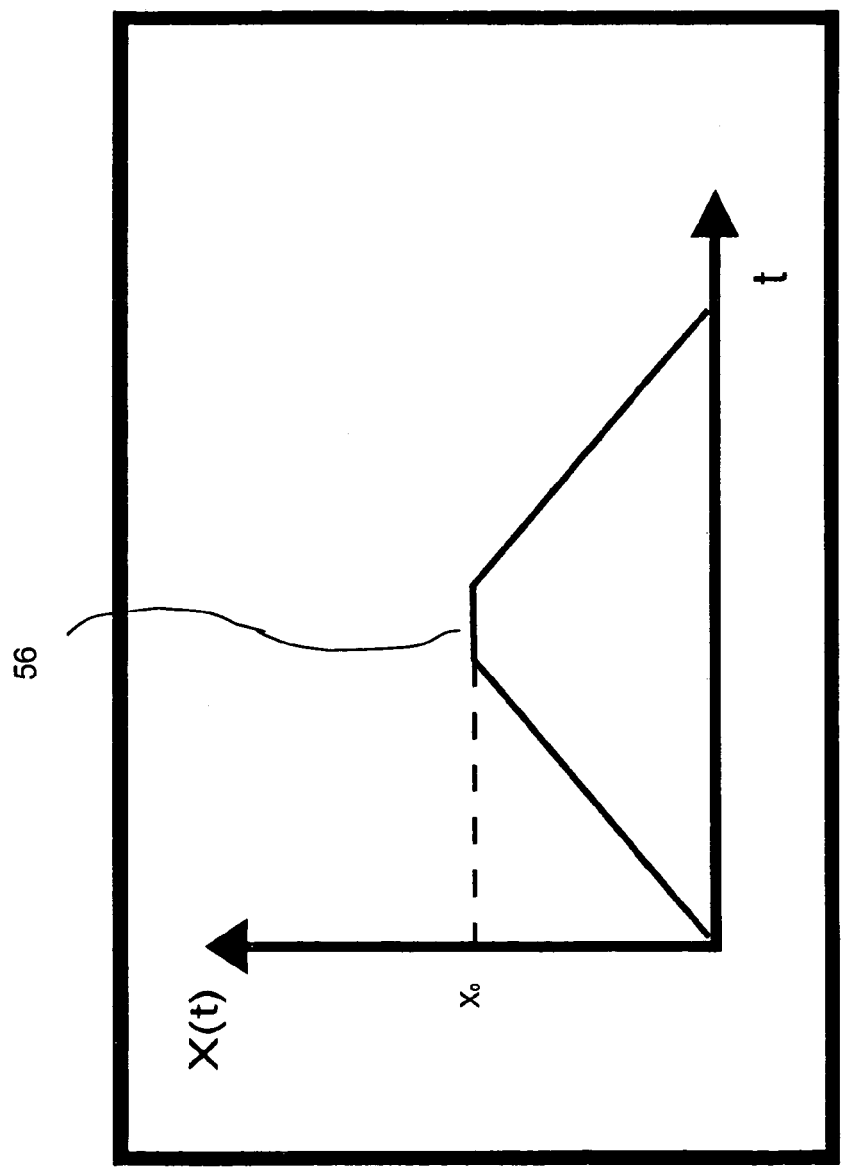
FIG. 8 shows the influence of backlash on a measured signal associated with the gear box, measurements of which were shown in FIG. 7, the influence being due to mechanical wear in the gearbox.

Ideally, the $X(t)$ behavior would be as it is shown in FIG. 7. As shown, $X(t)$ of the direct measurement system includes no backlash as the axis is moved forward and backward at a constant speed. The influence of backlash on the measured signal, due to mechanical wear, for example, can be seen in FIG. 8. As will be seen, due to the backlash in the system, the axis does not follow immediately. This is particularly apparent when the motor changes its rotation direction. At first, the axis stays at its current position and then moves back with a constant shift.

From the derived fingerprint, it is apparent that the errors can be determined earlier than when the critical state is reached and maintenance can be applied before breakdown of the system. It is possible, for example, to predict problems arising due to backlash by periodically repeating the measurement and checking whether a pattern of critical deviation occurs in comparison to the initial state of the machine has been reached. In addition, it will be appreciated that the degree of maintenance can be varied according to the fingerprint of the present invention. That is, there are degrees of abnormality of a fingerprint and, depending on the degree, it may be determined that maintenance is not yet needed. On the other hand, the fingerprint may be employed to determine minimum maintenance, deciding to allow the machine to continue to operate under less than optimum conditions, thereby better managing the maintenance of a machine.

The invention claimed is:

1. An electronic fingerprint apparatus for a machine, comprising:
    an automation component comprising: a controller for controlling movements of at least one component of the machine, the automation component adapted for capturing electronic fingerprints representative of a state of the machine and for determining which measurements of the machine will result in capturing electronic fingerprints representative of a state of the machine;
    the automation component further comprising a fingerprint device for selecting for measurement at least one type of movement of the machine from a plurality of different types of movements of the machine to generate an electronic fingerprint that is representative of a condition of the machine,
    wherein the fingerprint device selects the at least one type of movement of the machine for measurement based on its determination of which plurality of movements, when measured, will reveal the electronic fingerprint that is representative of the condition of the machine.

2. The apparatus of claim 1, wherein the automation component is selected from the group consisting of a numeric control, a motion controller, a programmable logic controller or an intelligent drive.

3. The apparatus of claim 2, wherein the fingerprint device and the automation component generate an electronic fingerprint having a deviation from the stable behavior, thereby indicating an unstable behavior of the machine.

4. The apparatus of claim 1, wherein the automation component and a corresponding engineering system provide a program platform for the implementation of electronic fingerprints by an application engineer.

5. The apparatus of claim 1, further comprising an engineering system corresponding to the automation component, wherein implementation of the fingerprints is done by at least one of a configuration process in the engineering system and a programming process using a specific API for the implementation of fingerprints.

6. The apparatus of claim 1, wherein the start of capturing the fingerprints is done by an action selected from the group consisting of: starting by local user via local HMI; starting by remote user via Ethernet / Internet; and starting based on an event evaluated in an application program running in the automation component.

7. The apparatus of claim 1, wherein the apparatus is used for a machine selected from the group consisting of: machine tools, packaging machines, a rubber-working machines; plastic-working machines; printing presses; woodworking machines; glassmaking machines; ceramic-working machines; stoneworking machines; textile machines; robotic manufacturing machines and materials handling machines.

8. The apparatus of claim 7, further comprising an application for comparing the electronic fingerprints over time.

9. The apparatus of claim 7, further comprising a memory for storing the electronic fingerprints as a database.

10. The apparatus of claim 1, wherein the fingerprint device and the automation component generate an electronic fingerprint that is generic to a type of machine tool that indicates a stable behavior of the machine tool.

11. The apparatus of claim 1, wherein the fingerprint device and the automation component generates a spccific fingerprint for a particular production machine that is representative of a state of at least one the outputs of the particular production machine and the stable behavior of the machine.

12. The apparatus of claim 1, further comprising a graphical user interface for displaying a graphical depiction of the electronic fingerprint.

13. The apparatus of claim 12, wherein the electronic fingerprint is downloaded over the remote communication to the remote processor.

14. The apparatus of claim 1, wherein the fingerprint device is adapted for generating a periodic electronic fingerprint that is developed from a snap shot of the state of the machine at a certain time.

15. The apparatus of claim 1, further comprising a maintenance scheduler for scheduling maintenance of the machine based on a prediction of a failure of the machine based on the electronic fingerprint.

16. The apparatus of claim 1, further comprising a remote communication capability that couples the machine to a remote processor.

17. In an automation component comprising a controller for controlling movements of at least one component of a machine, a method for generating electronic fingerprints of the machine, the method comprising the steps of:
  selecting, with the automation component, a set of parameters for measurement from a plurality of parameters that will uniquely identify a condition of the machine, the set of parameters associated with the at least one component of the machine and the plurality of parameters corresponding to different types of movement of the at least one component of the machine;
  reading the selected set of parameters; and
  storing the read parameters in storage coupled to the automation component, thereby creating an electronic fingerprint representative of the condition of the machine.

18. The method of claim 17, wherein the step of selecting selects parameters that at a time when the machine is in a stable state to generate thereby a generic type of electronic fingerprint that in4icates a stable behavior.

19. The method of claim 18, wherein the step of selecting selects parameters having a deviation from the stable behavior, thereby generating an electronic fingerprint indicating an unstable behavior of the machine.

20. The method of claim 17, wherein the step of selecting selects parameters from a particular production machine that is representative of a state of an output of the particular production machine.

21. The method of claim 17, further comprising the step of generating a graphical depiction of the electronic fingerprint.

22. The method of claim 17, further comprising the step of comparing the electronic fingerprints over time.

23. The method of claim 17, further comprising the step of scheduling maintenance based on the electronic fingerprint.

24. The method of claim 17, further comprising the step of remotely coupling the machine to a remote processor.

25. A computer recordable medium having encoded therein instructions for driving a computer processor of an automation component comprising a controller for controlling movements of at least one component of a machine according to the steps of:
  selecting, with the automation component, a set of parameters for measurement from a plurality of parameters that will uniquely identify a condition of the machine, the set of parameters associated with the at least one component of the machine and the plurality of parameters corresponding to different types of movement of the at least one component of the machine;
  reading the selected set of parameters; and
  storing the read parameters in storage coupled to the automation component, thereby creating an electronic fingerprint representative of the condition of the machine.

* * * * *

UNITED STATES PATENT AND TRADEMARK OFFICE
CERTIFICATE OF CORRECTION

PATENT NO. : 7,463,945 B2
APPLICATION NO. : 10/646402
DATED : December 9, 2008
INVENTOR(S) : Martin Kiesel et al.

It is certified that error appears in the above-identified patent and that said Letters Patent is hereby corrected as shown below:

Column 9, line 41, claim 11 please amend "generates a spccific fingerprint" to --generates a specific fingerprint--.

Column 9, line 43, claim 11 please amend "of at least one the outputs" to --of at least one of the outputs--.

Column 10, line 23, claim 18 please amend "fingerprint that in4icates" to --fingerprint that indicates--.

Signed and Sealed this

Eighth Day of December, 2009

David J. Kappos
*Director of the United States Patent and Trademark Office*